US011472206B2

(12) United States Patent
Ulacia Portoles et al.

(10) Patent No.: US 11,472,206 B2
(45) Date of Patent: Oct. 18, 2022

(54) PEN-TO-REFERENCE SPACE (PRS) SENSING

(71) Applicant: Hewlett-Packard Development Company, L.P., Spring, TX (US)

(72) Inventors: Rafael Ulacia Portoles, Sant Cugat del Valles (ES); Santiago Forcada Pardo, Sant Cugat del Valles (ES); David Fuertes Roncero, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 149 days.

(21) Appl. No.: 16/978,094

(22) PCT Filed: Apr. 11, 2018

(86) PCT No.: PCT/US2018/027135
§ 371 (c)(1),
(2) Date: Sep. 3, 2020

(87) PCT Pub. No.: WO2019/199302
PCT Pub. Date: Oct. 17, 2019

(65) Prior Publication Data
US 2021/0008902 A1   Jan. 14, 2021

(51) Int. Cl.
*B41J 11/00* (2006.01)
*B33Y 50/02* (2015.01)
*B29C 64/393* (2017.01)
*B41J 25/308* (2006.01)

(52) U.S. Cl.
CPC ......... *B41J 11/0095* (2013.01); *B29C 64/393* (2017.08); *B33Y 50/02* (2014.12); *B41J 25/3088* (2013.01)

(58) Field of Classification Search
CPC ................ B41J 11/0095; B41J 25/3088; B41J 25/3086; B29C 64/393; B33Y 50/02
USPC .......................................................... 347/16
See application file for complete search history.

(56) References Cited

U.S. PATENT DOCUMENTS

| | | | |
|---|---|---|---|
| 6,736,557 B2 | 5/2004 | DeVore et al. | |
| 7,044,575 B2 | 5/2006 | Kelley et al. | |
| 7,156,482 B2 | 1/2007 | Boleda et al. | |
| 7,431,412 B2 | 10/2008 | Flotats et al. | |
| 7,588,302 B2 | 9/2009 | Bastani | |
| 8,251,470 B2 | 8/2012 | Bastardas et al. | |
| 8,757,746 B2 | 6/2014 | Wing et al. | |

(Continued)

OTHER PUBLICATIONS

International Search Report and Written Opinion dated Feb. 21, 2019, PCT Patent Application No. PCT/US2018/027135, filed Apr. 11, 2018, Federal Institute of Industrial Property, Moscow, Russia, 7 pages.

*Primary Examiner* — Kristal Feggins
*Assistant Examiner* — Alexander D Shenderov
(74) *Attorney, Agent, or Firm* — HP Inc. Patent Department

(57) ABSTRACT

Method and tools for sensing pen-to-reference space (PRS) are disclosed. Example removable pen-to-reference space (PRS) sensing tools for a printer comprise proximity sensors and a body. The body has a printer mounting portion, corresponding to a printhead mounting socket of the printer, and a sensor portion, hosting the proximity sensor.

15 Claims, 5 Drawing Sheets

(56) References Cited

U.S. PATENT DOCUMENTS

| | | | |
|---|---|---|---|
| 2003/0099494 A1* | 5/2003 | Downing | B41J 11/0035 |
| | | | 400/56 |
| 2004/0047665 A1 | 3/2004 | DeVore | |
| 2004/0100512 A1 | 5/2004 | Codos | |
| 2007/0048057 A1 | 3/2007 | Youn et al. | |
| 2013/0249979 A1* | 9/2013 | Wing | B41J 25/3088 |
| | | | 347/8 |
| 2015/0165785 A1 | 6/2015 | Washington | |

* cited by examiner

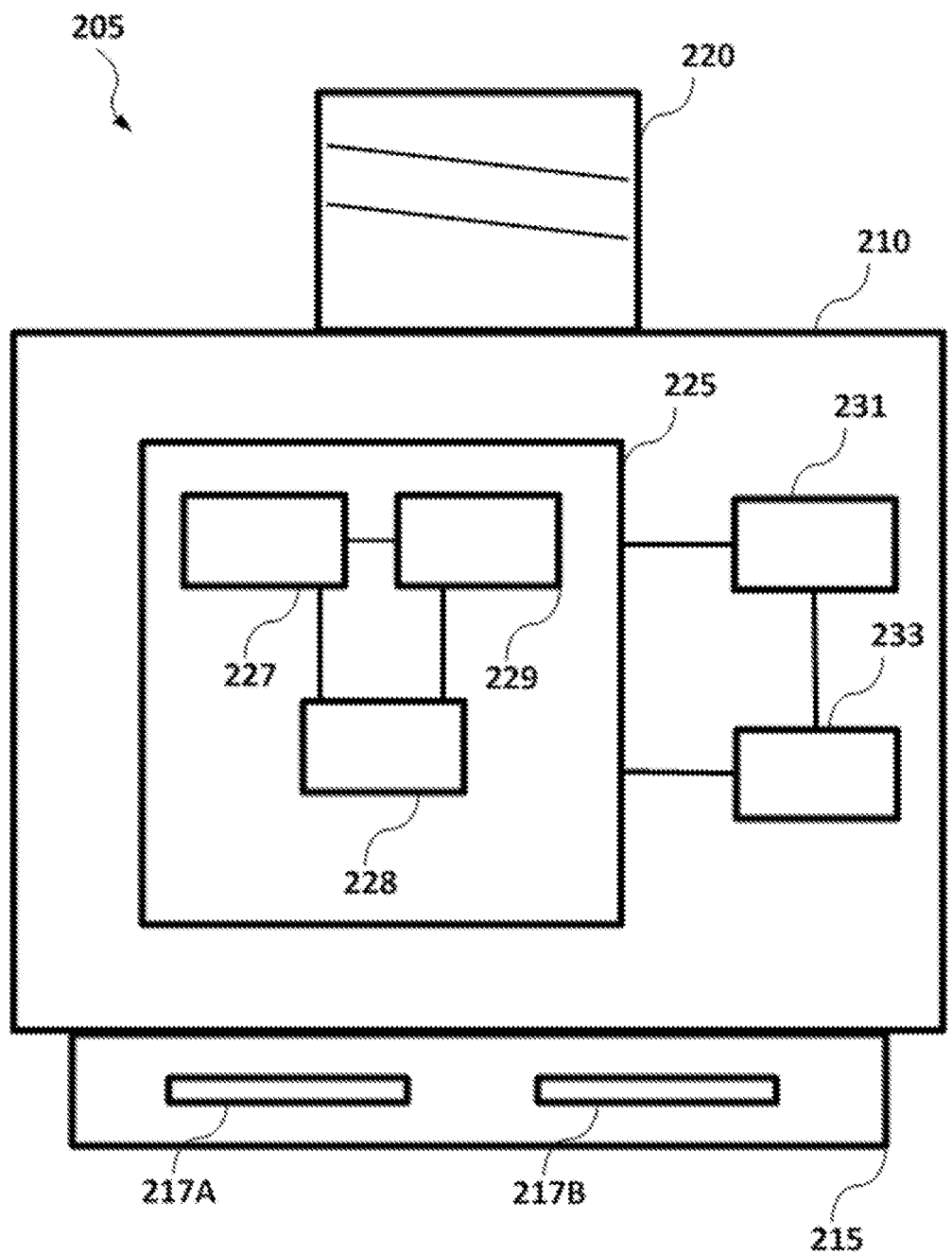
Fig. 2
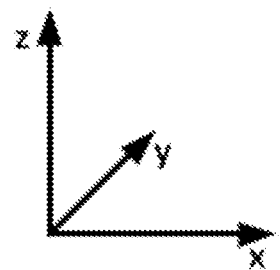

PEN-TO-REFERENCE SPACE (PRS) SENSING

BACKGROUND

Digital printing involves technologies in which a printed image is created from digital data, also known as two dimensional (2D) printing, and technologies where material is selectively solidified with the aid of printing fluids ejected from printheads on a bed of build materials, also known as three dimensional (3D) printing. Known methods of digital printing include full-color ink-jet, electrophotographic printing, laser photo printing, thermal transfer printing methods, plastic fused deposition modelling, material jetting and stereolithography. In some printing methods, a pen or printhead is mounted on a printhead support. Print media is guided on a print media support structure, also called a "platen". The printhead ejects printing fluid, e.g. through nozzles, in a printing space defined between the printhead and the print media.

BRIEF DESCRIPTION OF THE DRAWINGS

Various example features will be apparent from the detailed description which follows, taken in conjunction with the accompanying drawings, wherein:

FIG. 2 schematically illustrates a PRS sensing tool, according to an example;

DETAILED DESCRIPTION

The distance between a printhead and the print media is called pen-to-paper space (PPS) distance. PPS distance affects the final printing quality due to several aspects, e.g. the aerosol effect or the final position of the drop of print fluid, e.g. ink, onto the print media. The PPS distance may change due to the different thickness of the print media. A distance invariant to the media thickness is the space between the pen and a reference. Usually this reference is the platen. The distance is then called Pen to Reference Space (PRS) distance. To have a consistent print quality a constant PRS distance is desired after a pen calibration. However, the PRS distance in digital printing systems, e.g. in page wide array (PWA) printers, may change due to a twist in the printer structure or due to a platen deformation, e.g. caused by thermic loads. Some printing systems employ low cost solutions such as gauges of different thickness, to measure the PRS distance. However, such methods take time, are dangerous for the printheads, as they imply contact with sensitive electronic parts such as the nozzle plate, and tend to be less precise. Other printing systems include integrated tools to measure the PRS distance. However, including integrated tools in the printing system increases the cost of the printing system.

Figure 1:
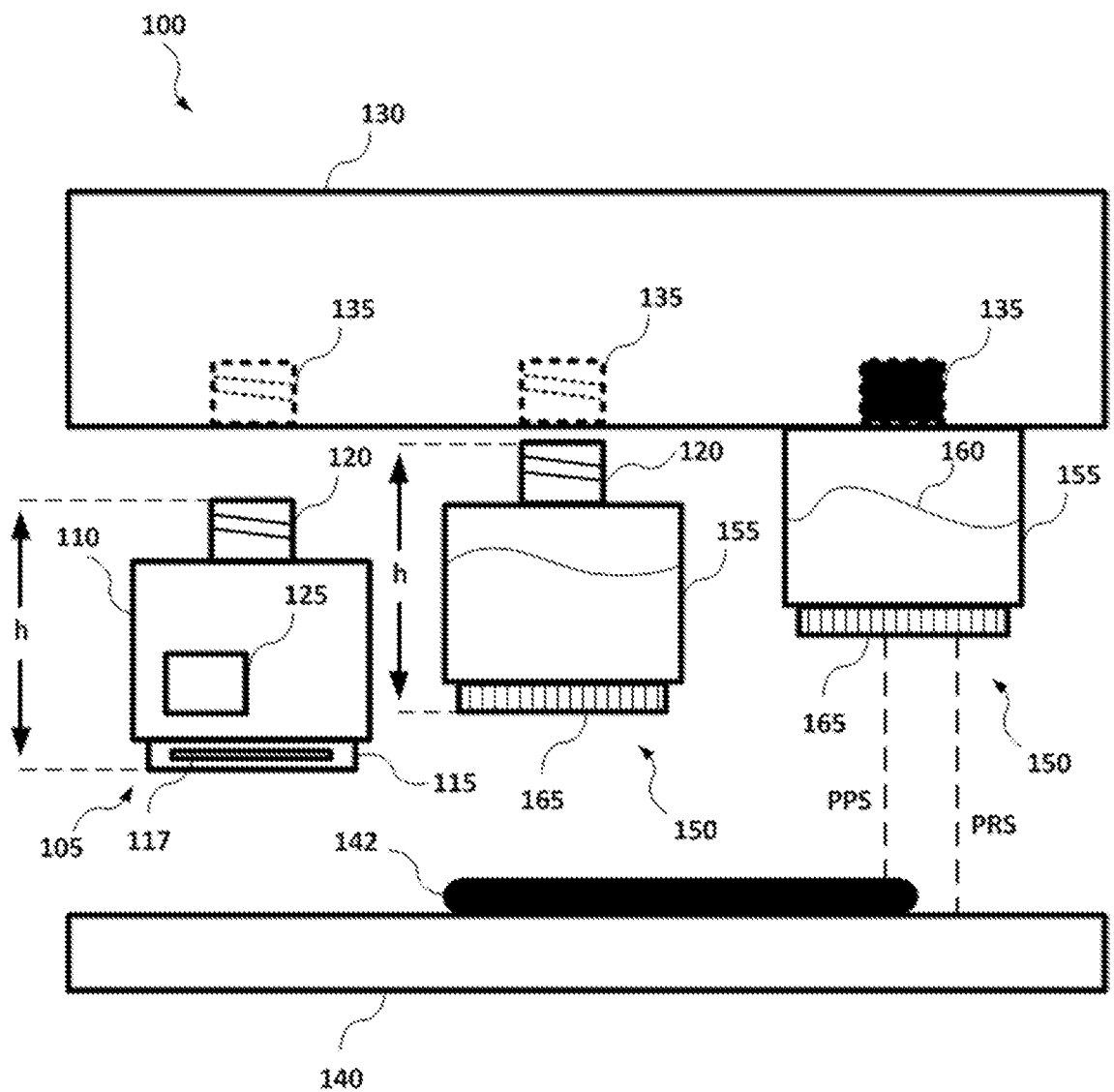
FIG. 1 schematically illustrates a printing system, according to an example.

FIG. 1 schematically illustrates a printing system with a removable pen-to-reference space (PRS) sensing tool, according to an example. A printer 100 includes a printbar 130 and a platen 140. Printbar 130 may also be referred to as a printhead support, printhead receiving station or pen support. Platen 140 may also be referred to as a print media support structure. Platen 140 may support print media 142. Printbar 130 may comprise printhead sockets 135. PRS sensing tool 105 may comprise body 110, sensor portion 115 and printer mounting portion 120. The sensor portion 115 may comprise proximity sensor 117. The proximity sensor 117 may be an inductive sensor. However, any other type of proximity sensor or distance sensing non-contact sensor may be used. The PRS sensing tool 105 may comprise or be otherwise in communication with a controller 125. The controller 125 may be hosted, e.g., in the body 110 or in the sensor portion 115. Each printhead socket 135 may correspond to printer mounting portions 120 of removable printheads 150. Printheads 150 may comprise a printhead body 155 containing a printing fluid 160 and a nozzle plate 165. A distance between the nozzle plate 165 and the platen 140 may be called pen-to-reference space distance (PRS). A distance between the nozzle plate 165 and the print media 142 may be called pen-to-paper space distance (PPS). The space between the nozzle plate 165 and the print media 142 may be defined as a "printing space".

The PRS sensing tool 105 is to measure the PRS distance. To facilitate such measurement, a size, e.g. height h, of the PRS sensing tool 105 may be similar to a size, e.g. height h, of printheads 150. However, if there is a difference in size, i.e., the sensing tool 105 is at a different distance from the platen 140 when compared with the printheads 150, then such difference may be taken into account and compensated when calculating PRS distance. The PRS sensing tool 105 may be provided with a printer mounting portion 120 similar to the printer mounting portions of printheads 150. Thus, when technicians or users are to measure PRS distance they may simply replace a printhead 150 with a PRS sensing tool 105 with minimum effort by fastening the PRS sensing tool 105 to printhead socket 135. The type of fastening between the printbar 130 and the printhead 150 may be of any fastening type provided for coupling printbars and printheads. In some examples the fastening may include a mechanical coupling and an electrical coupling. The printer mounting portion 120 may then include a mechanical socket engagement portion and an electrical socket engagement portion. The mechanical socket engagement portion is to clasp the body to the printhead mounting socket and the electrical socket engagement portion is to electrically connect the proximity sensor 117 with an electrical connection of the printhead mounting socket 135.

Once installed, the controller 125 of PRS sensing tool 105 may be powered on. The PRS sensing tool may include a power source, such as a battery, or may be provided with power by the electrical connection established through the electrical coupling with the printhead socket 135. The PRS sensing tool may measure PRS distance by measuring distance between the proximity sensor 117 and the platen 140. It may then communicate with the printer 100 or with an external, e.g. a technician's, computer or communication device to indicate the measurements. In some examples, the PRS sensing tool 105 may communicate with the printer 100 through the electrical coupling or through a wireless interface. The printer 100 may receive the measurements and adjust the distance based on the measurements received. For example, in case the distance is greater than a threshold printing distance or a range of printing distances, the printer 100 may lower the printbar 130 accordingly so that the distance to remain below the threshold printing distance or within the range of printing distances. In another example, the printer 100 may individually control the PRS distance of each printhead by e.g. controlling vertically the position of each printhead socket 135.

Using a removable PRS sensing tool allows for accurate PRS measurement without raising the cost of the printing system as the tool is not part of the printing system. As the measurement is contactless, there is no danger to damage the printhead. Also, the measurements are of a relatively high accuracy, allowing for a precise measurement and subsequent precise adjustment of the PRS distance.

FIG. 2 schematically illustrates a PRS sensing tool, according to an example. PRS sensing tool 205 includes a body 210, sensor portion 215 and printer mounting portion 220. The sensor portion 215 may include a proximity sensor 217A-217B. The proximity sensor 217A-217B may be a set of inductive sensors. The PRS sensing tool 205 may comprise a controller 225. The controller 225 may be hosted in the body 210, in the sensor portion 215 or may be remote and comprise a communication channel to communicate to the PRS sensing tool 205. The controller 225 may include a processor 227, a data storage 229 coupled to the processor and an instruction set 228. The instruction set 228 may cooperate with the processor 227 and the data storage 229 to receive measurements from the proximity sensor 217A-217B and perform calculations to determine PRS distance between the proximity sensor 217A-217B and the platen once the PRS sensing tool is mounted on a printer. In the example, instruction set 228 comprises executable instructions for the processor 227, the executable instructions being encoded in data storage 229. Instruction set 228 cooperates with the processor 227 and data storage 229 to receive the measurements from the proximity sensor 217A-217B and perform the PRS distance calculations. Data storage may include any electronic, magnetic, optical, or other physical storage device that stores executable instructions. In an example, controller 225 is an electronic controller which communicates with the printer. In an example, the controller is an electronic controller which comprises a processor 227 and a memory or data storage 229 and possibly other electronic circuits for communication including receiving and sending electronic input and output signals. An example electronic controller may receive data from a host system, such as a computer, and may include memory for temporarily storing data. Data may be sent to an electronic controller along an electronic, infrared, optical or other information transfer path. The processor 227 may perform operations on data. In an example, the processor is an application specific processor, for example a processor dedicated to PRS measurement or calibration. The processor may also be a central processing unit. In an example, the processor comprises an electronic logic circuit or core and a plurality of input and output pins for transmitting and receiving data. Data storage 229 may include any electronic, magnetic, optical, or other physical storage device that stores executable instructions. Data storage 229 may be, for example, Random Access Memory (RAM), an Electrically-Erasable Programmable Read-Only Memory (EEPROM), a storage drive, an optical disk, and the like. Data storage 229 is coupled to the processor 227. The PRS sensing tool 205 may further comprise a communication interface 231 and/or a power source 233. The communication interface 131 may be wireless (e.g. Bluetooth) or wired and may be powered by power source 233. The power source may be provided with the PRS sensing tool (e.g. in the form of a battery) or may be a power interface receiving power from an electrical coupling when the PRS sensing tool 205 is mounted to a printer. Such electrical coupling may also provide a communication connection and the PRS sensing tool 105 may communicate directly any measurements to the printer.

Figure 3:
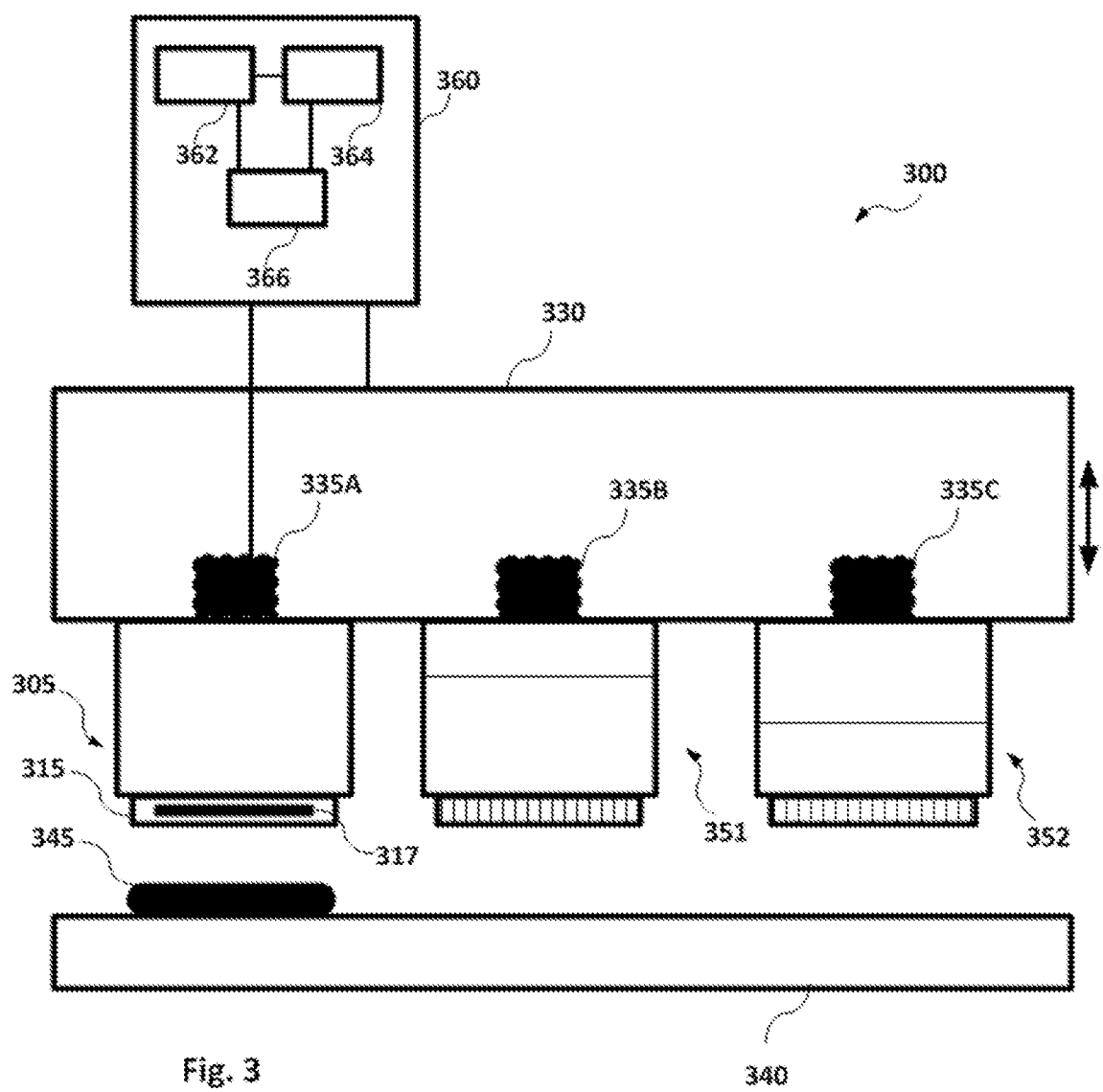
FIG. 3 schematically illustrates a printing system with a PRS sensing tool, according to an example.

FIG. 3 schematically illustrates a printing system, according to an example. The printing system 300 may comprise a printbar 330 and a platen 340. The printbar 330 may comprise printhead sockets 335A, 335B, 335C. Printhead sockets 335A, 335B, 335C are to receive printheads, e.g., during a printing operation. During a PRS calibration, installation or maintenance operation a PRS sensing tool 305 may be coupled to a printhead socket, e.g. printhead socket 335A. During such an operation, sockets 335B and 335C may either host printhead 351 and printhead 352, respectively, or they may host other PRS sensing tools or they may remain empty. A metallic target 345 may be associated to the platen 340, e.g., placed on the platen 340. Alternatively, the platen may be metallic or may include metallic inserts. A metallic target 345 allows for an inductive operation in case the platen and/or the print media do not contain any metallic or insufficient metallic components to allow for a remote inductive detection. The metallic target 345 may be placed in a printing space below the PRS sensing tool 305. Upon operation, the PRS sensing tool 305 may detect the presence of the metallic target 345. Based on the power of the detection signal, the PRS sensing tool 305 may measure the distance between the sensor area 315 and the metallic target 345. The measured distance may then be communicated or presented to the tool user or to the printer directly. For example, the PRS sensing tool 305 may comprise a communication module to send the measurement to a remote receiver held by the user. The user may then decide to make adjustments to the distance by, e.g. moving the printbar. Alternatively, the measured distance may be communicated to a printer controller 360. The printer controller 360 may comprise a processor 362, a data storage 364 coupled to the processor 362 and an instruction set 366. The instruction set 366 may cooperate with the processor 362 and the data storage 340 to communicate with the PRS sensing tool 305. The data storage 364 may include a database of printhead types and associated PRS distances or distance ranges. The processor 362 may receive the measured distance and compare the measured distance with the stored distances or distance ranges associated with the printheads that are stored in the database of data storage 364 and that correspond to the printhead socket where the PRS sensing tool 305 was coupled. If the measured distance is within a PRS distance range stored in the memory then no action may be taken. If, however, the measured distance is outside the stored distance range, then the instruction set 366 may cooperate with the processor 362 and the data storage 340 to move the printbar 330 accordingly; to increase or reduce the PRS distance. The PRS sensing tool 305 may then perform a distance measurement to verify that such a movement has produced the desired effect, i.e. that the PRS distance is within the stored PRS distance range.

Figure 4:
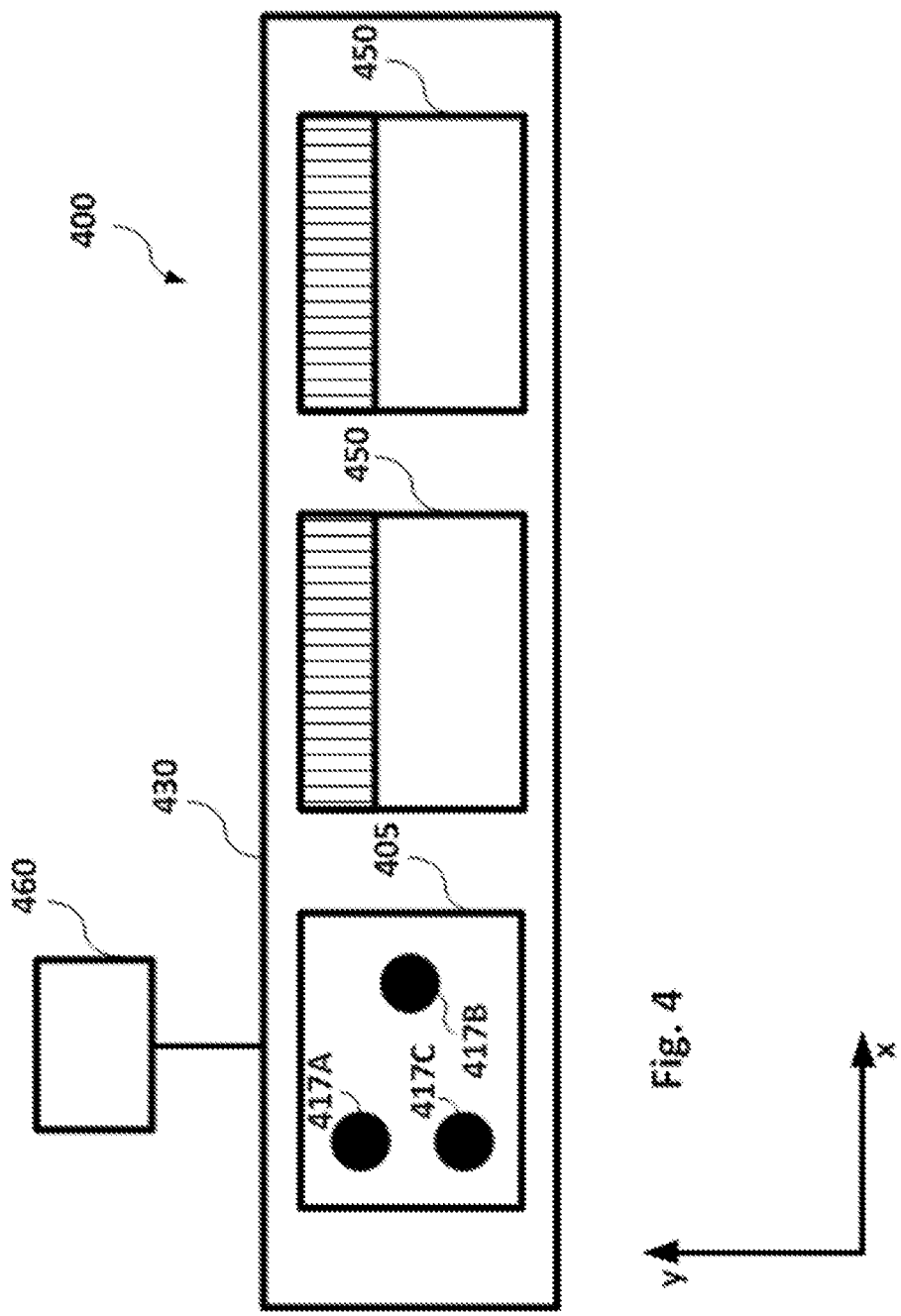
FIG. 4 schematically illustrates a bottom view of an example printing system, according to the present disclosure.

FIG. 4 schematically illustrates a bottom view of a printbar 430 of a printing system 400, according to an example. A PRS sensing tool 405 may be hosted in or coupled to a socket (not shown) of printbar 430. Printheads 450 may be hosted in or coupled to other sockets of the printbar 430. The PRS sensing tool 405 may comprise sensors 417A-417C distributed on the bottom surface of PRS sensing tool 405. Each of the sensors 417A to 417C may measure or determine or calculate, e.g. issue a signal associated to a distance to the platen, a PRS distance from a platen (not shown). A plurality of sensors allows for determining or calculating PRS distances as well as inclinations of the print bar with respect to the print media. For determining inclinations in two dimensions, x and y, three or more sensors, such as sensors 417A to 417C, may be used. If all the distances measured by the sensors are within a stored distance range, then the printbar may be considered to be parallel, i.e. no inclination may be identified, and at a suggested PRS distance to the platen. Otherwise, if some of the distances measured, but not all, are within the stored PRS distance range, an inclination may be identified. Then relative movement of one side of the printbar 330 may be performed to correct the inclination and to place the PRS distances within the stored or suggested PRS distance range. If all the values are outside the stored PRS distance or distance range, then a movement or vertical translation of the entire printbar 330 may be performed. However, some part or a side of the printbar 330 may be moved more than another part or side of the printbar 330, depending on the standard deviation of measured distances by the various sensors of the PRS sensing tool 305. Alternatively, the printer controller 360 may control the position of the printheads 450 individually. For example, the printer controller 360 may lower or raise the corresponding printhead sockets, thus indirectly lowering or raising any printheads mounted on the affected sockets. It may also control inclination of the printhead sockets, thus indirectly affecting inclination of any mounted printheads.

Figure 5:
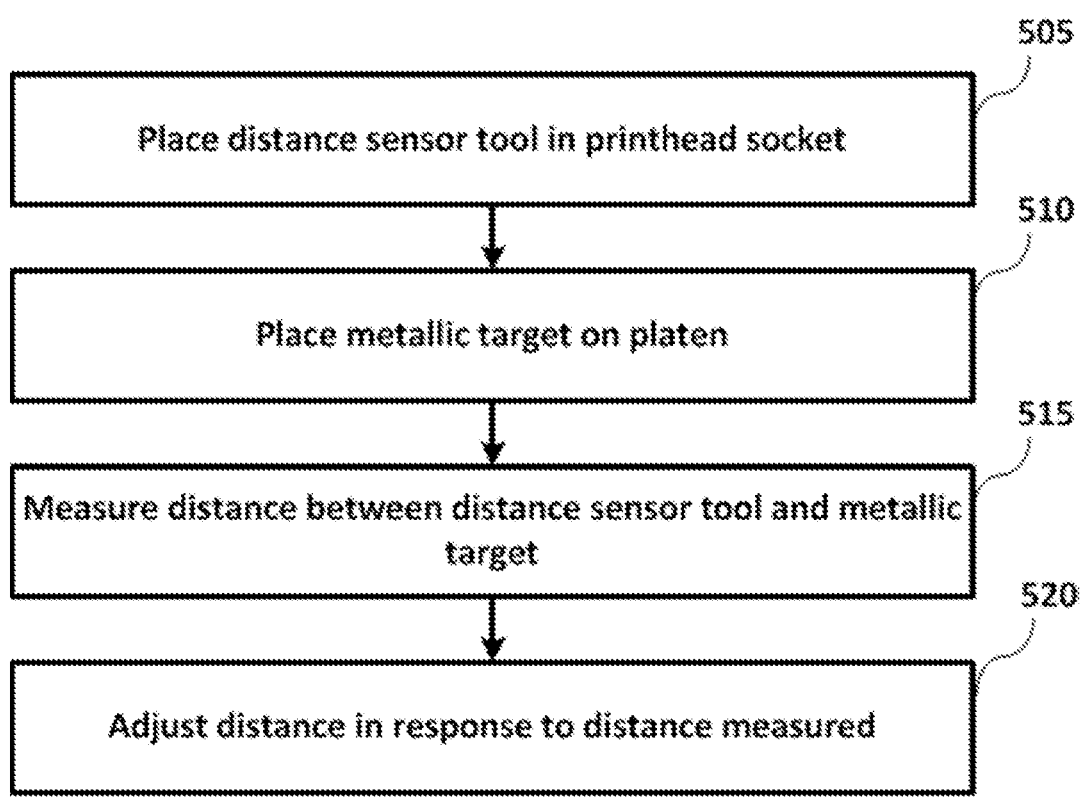
FIG. 5 is a flow diagram of a method of adjusting PRS distance, according to an example

FIG. 5 is a flowchart of a method of measuring PRS distance in a printer, according to an example. In block 505, an inductive PRS sensing tool is placed in a printhead socket. Placing the inductive PRS sensing tool in a printhead socket may be preceded by the removal of a printhead already present in the printhead socket. In block 510, a metallic target may be placed on a platen of the printer. As the platen may not contain any metallic material or may contain insufficient metallic material for an accurate measurement, the placing of the metallic target allows for more precision as the signal received by the sensor shall be stronger. In block 515, distance between the PRS sensing tool and the metallic target may be measured. Such measurement may be direct, if the sensing tool is a distance measuring tool. Otherwise, if a proximity sensor is used, the distance may be determined by measuring a physical quantity or a variation of a physical quantity. Examples of such physical quantities may include a voltage or a resonant frequency at the sensor. The controller of the PRS sensing tool may comprise a processor and a memory. The memory may store pairs of physical property values and associated distances. The processor may receive physical property measurements and compare it with the stored physical property values to identify or infer the distance corresponding to the measured physical property. In block 520, distance between printbar and platen may be adjusted in response to distance measured or identified. Such adjustment may comprise relative movement between printbar and platen. Such relative movement may be partial (e.g. of a side of the printbar or of an individual printhead or printhead socket) or may involve the relative displacement of the whole printbar with respect to the platen.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A removable pen-to-reference space (PRS) sensing tool for a printer, comprising:
    a body having a same size as a printhead of the printer to imitate the printhead, the body of the PRS sensing tool including:
        a printer mounting portion protruding on one side of the body to be inserted into a printhead mounting socket of the printer to attach the PRS sensing tool to the printer and replace the printhead for a calibration operation of the printer,
        a sensor portion on another side of the body, hosting a proximity sensor, wherein, during the calibration operation, the proximity sensor measures a distance between the proximity sensor and a platen of the printer to represent a PRS distance between the printhead to the platen, and
        a controller to receive the measured distance from the proximity sensor and send the measured distance to the printer for the printer to adjust the PRS distance between the printhead and the platen.

2. The removable PRS sensing tool according to claim 1, wherein PRS sensing tool is attached to the printer during the calibration operation of the printer and removed from the printer during a printing operation of the printer.

3. The removable PRS sensing tool according to claim 1, the printer mounting portion comprising a threaded portion to be screwed into the printhead mounting socket of the printer and an electrical socket engagement portion to electrically connect the proximity sensor with an electrical connection of the printhead mounting socket.

4. The removable PRS sensing tool according to claim 1, wherein the proximity, sensor comprises a transmitter to transmit measurements to a remote receiver.

5. The removable PRS sensing tool according to claim 1, the proximity sensor comprising an inductive sensor.

6. The removable PRS sensing tool according to claim 5, the inductive sensor to measure a physical quantity induced by a metallic target on the platen and to determine a distance between the inductive sensor and the metallic target based on the measured physical quantity.

7. The removable PRS sensing tool according to claim 6, the controller having a processor and a memory to store pairs of physical quantity values and associated distances, respectively, the processor to receive physical quantity measurements from the proximity sensor and the pairs of physical quantity values and associated distances stored in the memory and infer the distance between the inductive sensor and the metallic target based on the received physical quantity measurements.

8. The removable PRS sensing tool according to claim 1, wherein the proximity, sensor comprises multiple sensing elements.

9. The removable PRS sensing tool according to claim 8, wherein the proximity sensor comprises three sensing elements.

10. A printing system, comprising:
    a printbar including a printhead socket;
    a platen below the printbar;
    a controller; and
    a pen-to-reference space (PRS) sensing tool having a same size as a printhead to imitate the printhead and removably attached to the printhead socket of the printbar for a calibration operation of the printing system, the PRS sensing tool including:

a body including a mounting portion protruding on one side of the body to be inserted into the printhead socket of the printbar, and a distance sensor located on another side of the body, wherein, during the calibration operation, the distance sensor measures a distance between the distance sensor and the platen and sends the measured distance to the controller for the controller to adjust the distance between the printbar and the platen.

11. The printing system according to claim 10, the printbar comprising multiple printhead sockets, wherein the PRS sensing tool is attached to one printhead socket and a plurality of printheads are attached to remaining printhead sockets.

12. The printing system according to claim 10, further comprising a metallic target on the platen, the distance sensor to measure a distance between the distance sensor and the metallic target.

13. A method for measuring pen-to-reference space (PRS) distance between a printbar and a platen in a printer, comprising:

inserting a PRS sensing tool into a printhead socket of the printbar, the PRS sensing tool having a same size as a printhead to imitate the printhead and attached to the printbar to replace the printhead during a calibration operation of the printer, and the PRS sensing tool including: a mounting portion protruding on one side to be inserted into the printhead socket and a proximity sensor located on another side of the body;

measuring, by the proximity sensor, a distance between the proximity sensor and the platen during the calibration operation;

sending, by the proximity sensor, the measured distance to a controller; and adjusting, by the controller, the PRS distance between the printbar and the platen in response to the measured distance received from the proximity sensor.

14. The method according to claim 13, the proximity sensor comprising an inductive sensor, and the method comprising:

placing a metallic target on the platen; and measuring a physical quantity induced by the metallic target on the platen to determine a distance between the inductive sensor and the metallic target.

15. The method according to claim 13, adjusting the PRS distance comprising moving the printbar or the printhead socket in response to the measured distance received from the proximity sensor.

* * * * *